March 8, 1966 R. A. OSWALD 3,238,895
FILM CARRIER SYSTEM
Filed Dec. 1, 1964 3 Sheets-Sheet 1
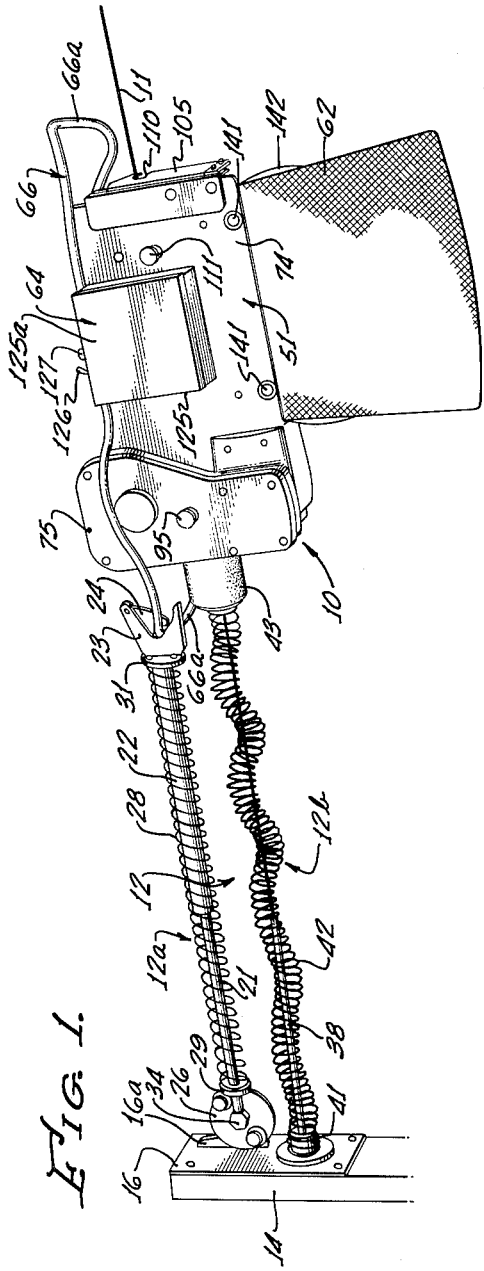
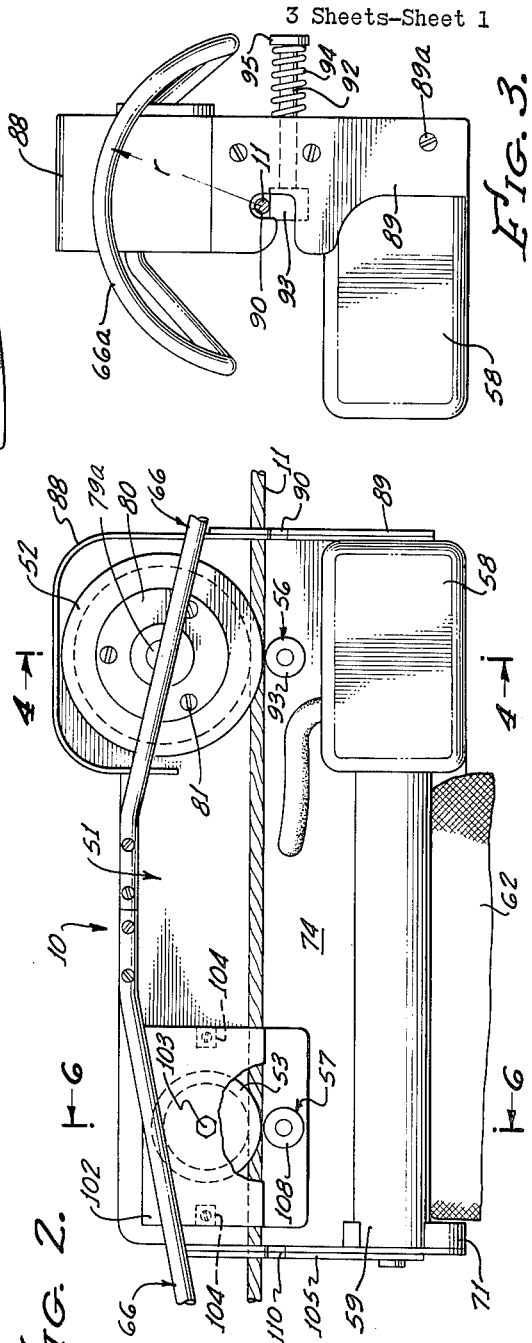
INVENTOR.
ROBERT A. OSWALD
BY FOWLER, KNOBBE
& GAMBRELL
ATTORNEYS.

March 8, 1966   R. A. OSWALD   3,238,895
FILM CARRIER SYSTEM

Filed Dec. 1, 1964   3 Sheets-Sheet 2

INVENTOR.
ROBERT A. OSWALD

BY FOWLER, KNOBBE
& GAMBRELL
ATTORNEYS.

March 8, 1966   R. A. OSWALD   3,238,895
FILM CARRIER SYSTEM
Filed Dec. 1, 1964   3 Sheets-Sheet 3
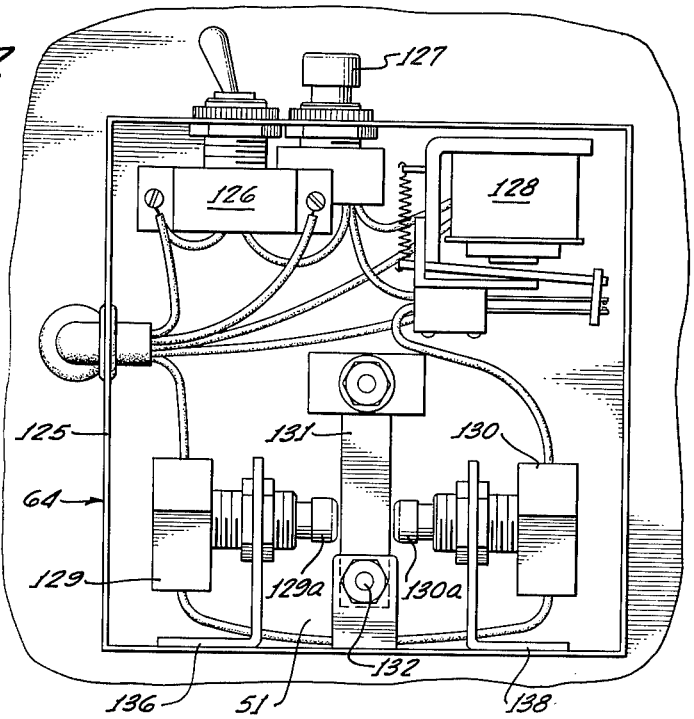
Fig. 7.
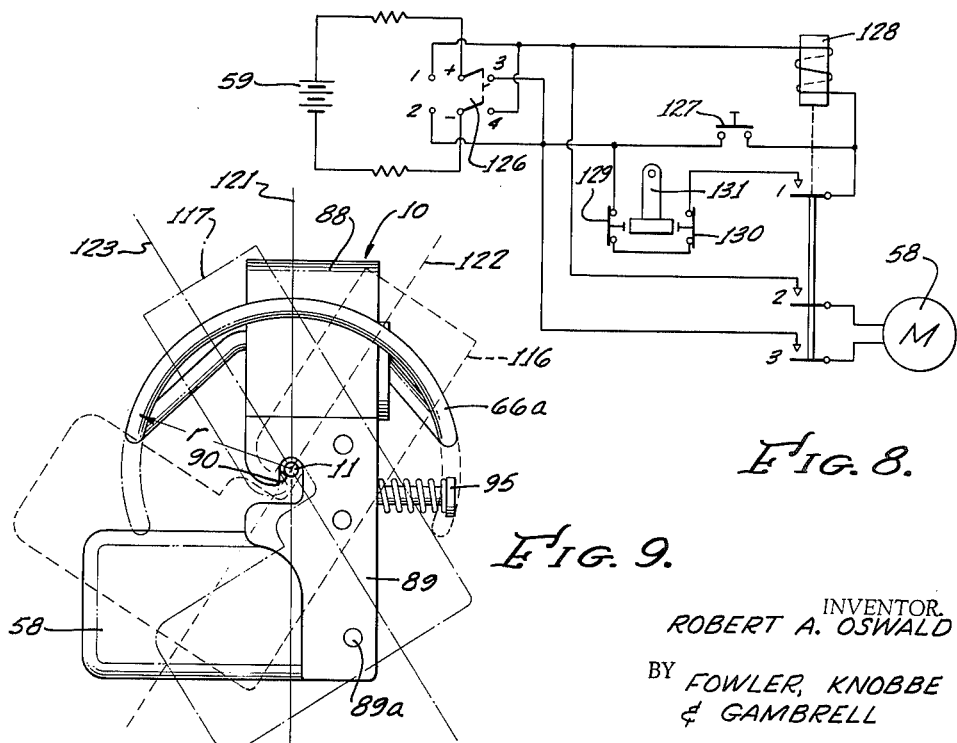
Fig. 8.
Fig. 9.
INVENTOR.
ROBERT A. OSWALD
BY FOWLER, KNOBBE
& GAMBRELL
ATTORNEYS.

United States Patent Office 3,238,895
Patented Mar. 8, 1966

3,238,895
FILM CARRIER SYSTEM
Robert A. Oswald, 5701 W. Adams Blvd.,
Los Angeles, Calif.
Filed Dec. 1, 1964, Ser. No. 415,112
18 Claims. (Cl. 105—150)

This application is a continuation-in-part of application Serial No. 280,257, which was filed May 14, 1963. This application is now abandoned.

The present invention relates to a system for transporting materials between remote locations and, more particularly, to a self-powered carrier and means cooperating therewith to transport film of sporting events and the like between remote locations.

It is uniform practice at most race tracks to make a motion picture film of each race for viewing by the judges before the winners are officially certified. In order to make such a film patrol of each race, the motion picture is normally taken from a camera tower located in the infield of the track. As soon as the race is over, the exposed film must be sent to a processing station, which is usually under the track stands, where it is developed. Thereafter, the film is sent to the judges stand, usually high atop the grandstand, for viewing by the judges before the next race begins. By viewing the film, it is possible for the judges to determine, among other things, whether any of the jockeys committed rule infractions which would disqualify them.

It can be appreciated that the relatively short period of time between races makes it necessary to dispatch the film to the central processing station and develop it for viewing by the judges promptly. While the transit time for the film is not the only problem, its reduction or virtual elimination is important. Moreover, if the messenger who has heretofore hand carried the film can be eliminated, the film shooting and processing costs can be reduced materially.

One system of film delivery is described in my U.S. Patent No. 2,978,991 issued on April 11, 1961, for a Cable Retainer on Suspended Film Carrier. This patent describes a non-motorized or powerless film carrier wherein the film is transported from the elevated camera tower to a lower processing station along an inclined guide wire under the force of gravity. While this patented film carrier works well enough when the infield tower is at a greater height than the processing station, it is also apparent that it has certain disadvantages, particularly in that the carrier has to be hand carried or at least manually returned to the tower before the next race, or a number of film carriers have to be provided.

Another disadvantage is that, while the camera tower is relatively high with respect to the track (where the processing station or film laboratory is usually located), it is normally below the upper reaches of the grandstand where the judges stand is located. Thus, after the film is processed, it still has to be sent by messenger to the judges stand. The gravity carrier, while constituting an improvement over having a messenger carry the film between the camera tower, processing station and judges stand, is still inadequate to solve the overall problem.

The present invention is an improvement over this gravity-type carrier and other prior art devices in that it provides a power driven film carrier that is able to move up or down the wire cable guide connecting spaced-apart stations. The carrier can not only be sent between the infield camera tower and the processing station without regard to their relative heights, but it can also be employed to transport the developed film between the processing station and the judges stand.

In addition, the present system provides retaining means at each remote location which slows the film carrier down as it approaches a remote location, disables the carrier's drive means and retains the carrier at that remote location.

The film carrier used in the present system is supported on a wire cable strung between a pair of remote stations by a pair of guide wheels. A self-contained power pack and motor is operable to rotate one of the wheels to move the carrier along the wire cable. A control circuit permits the carrier direction to be selected and includes means to enable the carrier drive means and means that cooperate with terminal equipment to automatically stop the carrier when it reaches its destination.

The principal improved features of the present film carrier system, over and above the ones disclosed in the parent application, are the means for de-energizing or disabling the film carrier drive means when the carrier reaches a terminal location and the means provided to hold the film carrier at the terminal location.

In the earlier embodiment, a switch on the film carrier was operated by a projection at the terminal post of each remote location, and no positive retaining means were provided at all. It was found in practice that the carrier occasionally swayed so much as it moved along the cable that the switch would not be actuated. The deleterious effort of not shutting off the motor is readily apparent unless a person at the terminus was there to cut it off.

The present embodiment overcomes this occasional malfunctioning by providing a retainer hook suspended in spaced-apart relation to the wire cable and in line with an arcuate retainer bar on the carrier which causes the carrier drive means to stop. The use of the de-acceleration force, created when the carrier stops, to disable the drive means is a marked improvement over the mechanically actuated switch employed in the earlier embodiment.

The use of this same hook to hold the carrier positively at the terminal location after the drive means is disabled has also proved valuable inasmuch as it means that the frictional force of the drive means does not have to be depended upon to hold the carrier at the terminal position. This is particularly helpful where the buffer means is rather substantial and the carrier has a tendency to "bounce" away from the terminal position.

Aside from the foregoing features, the present invention retains all of the other salutory features possessed by my earlier self-powered film carrier. For example, it provides a motorized film carrier having its own power pack so that it does not require external power connections and it uses a power pack that can be recharged or replaced from time to time without difficulty, it provides a carrier that can be moved selectively in either direction, and it provides means to positively retain the carrier on the wire cable.

From the foregoing, it can be appreciated that the principal object of this invention is to provide a wire guide film carrier system for interconnecting remote locations which is versatile, rugged, safe and economical.

These and other objects, advantages and features of the present invention may be more fully understood when the following detailed description is read with reference to the drawings in which:

FIG. 1 is a perspective side view of the system including the motorized film carrier mounted on a wire cable and the terminal equipment at one of the remote locations;

FIG. 2 is a side view of the motorized film carrier with certain parts omitted to more clearly show the means by which the film carrier is supported on a wire cable;

FIG. 3 is an end view of the exemplary embodiment illustrated in FIGS. 1 and 2;

FIG. 7 is a plan view of the components in the control circuit of the exemplary carrier;

FIG. 8 is a schematic diagram of the control circuit illustrated in FIG. 7; and, FIG. 9 is a partial end view of the motorized film carrier similar to FIG. 3 but with certain parts omitted to illustrate the relatively constant distance maintained between the carrier retainer bar and the wire cable irrespective of transverse movement of the carrier about the wire guide.

Figure 4:
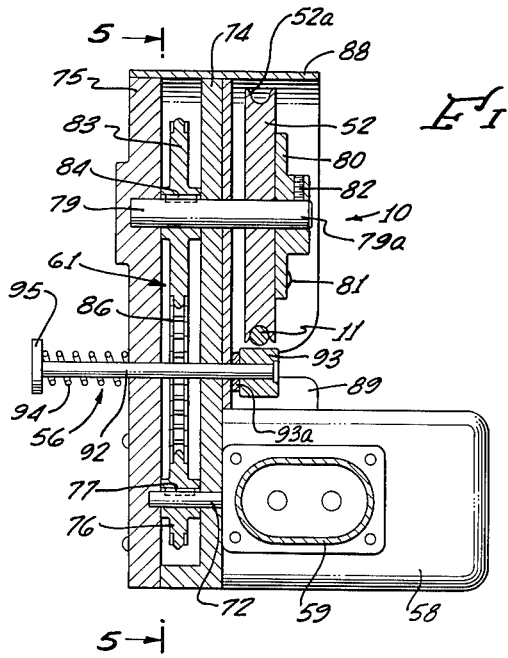
FIG. 4 is a section taken along line 4—4 of FIG. 2 to show a cable retainer means.
Figure 5:
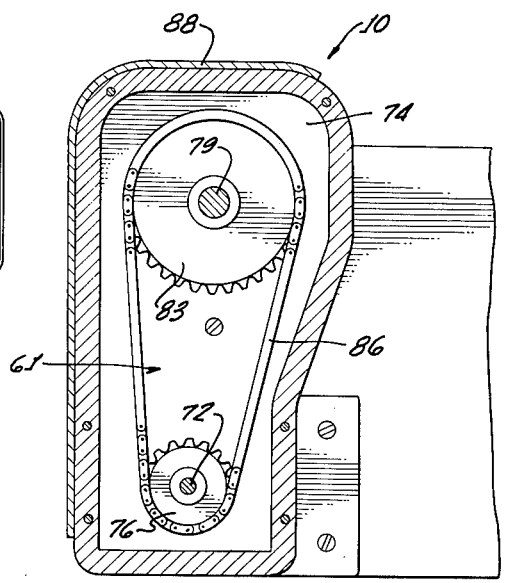
FIG. 5 is a section view taken along line 5—5 of FIG. 4 to depict the drive linkage of the carrier.

The present film carrier system basically includes a film carrier 10, a wire cable 11 stretched between two or more remote locations to support the carrier 10, and terminal means 12 provided at each remote location at which a wire cable 11 is terminated for stopping the carrier and engaging it.

Looking particularly to FIG. 1, the motorized film carrier 10 is shown supported on the wire cable 11 adjacent a typical remote location, which might be the wall of the film processing laboratory. Comparable equipment would be provided at the other end of wire cable 11, for example, at the judges stand or at the camera tower.

The terminal means 12 includes engaging means 12a and auxiliary de-acceleration means 12b. Both are connected to a terminal base plate 16 which is bolted or otherwise attached to a dead-end post 14.

The engaging means 12a comprises a tubular member 21, which is attached at one end to apertured plate 26, and hollow tubular member 22. The plate 26 is pivotally attached to extension 16a of the base plate 16 by machine screw 34. A hook 23 which has a gravity operated keeper 24 is attached to the outer end of member 22. The members 21 and 22 are concentrically mounted so that member 21 telescopes interior of tube 22. A coil spring 28 encircles members 21 and 22 and is compressed between shoulder 29 on member 21 (adajcent the base member 26) and shoulder 31 on member 22 (adjacent the hook 23) so as to urge the tubular members 21 and 22 to maintain their maximum overall length.

While the dead-end post 14 can be immediately adjacent the remote location, it can also be part of the camera tower, judges stand or film processing laboratory. It is only necessary that a stable fixed point of attachment be provided for the wire cable 11 and engaging and de-accelerating means 12.

The wire cable 11 is terminated at plate 16 and terminal post 14 through a hollow sleeve or pipe 38 which is welded or otherwise affixed to plate 16. The pipe 38 is disposed in parallel relation to engaging means 12a so that the proper spacing is maintained between the hook 23 and the wire cable 11 even though the angle between the wire cable 11 and the flat surface of plate 16 may vary widely—due to different height differences between the terminating locations for cable 11.

The de-acceleration means 12b includes an enlarged shoulder 41, which can be formed as an integral part of plate 16 or attached thereto by screws or other conventional means, a coil spring 42 which encircles the tubular member 38 and wire cable 11, and a resilient bumper or impact absorbing device 43 on its outermost end. The spring 42 urges the bumper 43 outward to a point just forward of the retaining hook 23 and so that the film carrier 10 first contacts the bumper 43 rather than the keeper 24 of retainer hook 23. By selecting the relative strength of the spring 42 and its uncompressed length, it is possible to pre-position the bumper 43 at a preselected distance outward on wire cable 11—in advance of the retainer hook 23 of the engaging means 12.

The motorized film carrier 10 includes a frame member or body 51 having a drive wheel or sheave 52 and a stabilizing, auxiliary or idler wheel or sheave 53 which jointly mount the carrier 10 on the wire cable 11. Wire cable retention devices 56 and 57 cooperate with the wheels 52 and 53, respectively, to prevent the film carrier 10 from falling off the wire cable 11 during use.

The film carrier 10 also includes an encased motor 58 powered by a rechargeable encased battery 59, power converting means 61, a film pouch 62 attached to the frame 51, a retainer or grab bar 66 which extends outwardly at each end of the carrier 10, and a control circuit 64 which cooperates with the power source 58–59 to control the starting and stopping of the film carrier 10 as it is moved between remote locations.

The drive means for the motorized film carrier 10 may be considered to include the motor 58, the power pack or battery 59, the converting means 61 and the drive wheel 52.

The motor 58 and power pack 59 are an integral unit which is held on the frame 51 by a pivoted locking device 71 and by screws (not shown) which attach its other end to plate 51.

The power pack and motor unit can be of more or less conventional construction. One commercial unit which has been found to work quite well for the film carrier of the present invention is manufactured by Black and Decker Company for use in its model C–670 electrical hedge trimmer. The battery of power pack 59 may be removed after locking device 71 is pivoted so that it can be recharged as necessary. The motor 58 is a direct current motor and can be driven in either direction by merely reversing the polarity of the current applied to its armature winding.

As can be seen most clearly in FIG. 4, the shaft 72 of the motor 58 is journaled between the parallel, spaced-apart support plate 74 and back plate 75, both forming part of the frame 51. A sprocket 76 is locked on the shaft 72 by way of a key 77 disposed in a guideway in the shaft 72.

A shaft 79 is journaled between the support plate 74 and the back plate 75 at a spaced-apart, parallel distance from the shaft 72 of the motor 58. It is adapted to receive the drive wheel 52 on its outermost end 79a. Drive wheel 52 is held on the shaft end 79a by locking plate 80 which is affixed to the side of the drive wheel 52 by screws 81. Set screw 82 locks plate 80 to the shaft 79.

A sprocket 83 is mounted on the shaft 79 intermediate the plates 74 and 75. It is locked against rotation with respect to the shaft 79 by key 84 which rides in a keyway.

A sprocket chain 86 is provided within the parallel space between the plates 74 and 75 to mechanically interconnect the sprockets 76 and 83 so that rotation of the motor shaft 72 will cause the drive wheel 52 to rotate.

A protective cover plate 88 of a generally inverted J-shape is attached to the upper and side edges of plates 74 and 75. Plate 88 encloses the drive wheel 52 and the sprockets and chain drive mounted intermediate plates 74 and 75.

An end-plate 89 is attached to the cover plate 88 by screws 89a and both plates are apertured at 90 to receive the wire cable 11 and to help retain it beneath the drive wheel 52 during the operation of the carrier system.

Drive wheel 52 and auxiliary wheel 53 have V-grooves 52a and 53a formed in their peripheral edges so that they snugly receive wire cable 11. In order to provide frictional engagement between the wheels 52 and 53 and the cable 11 sufficient for the drive wheel 52 to drive the carrier 10 up a steep incline, the wheels are made of a material having a high coefficient of friction such as hard rubber, a fibrous material, plastic or specially treated metals.

The wire cable retainer means 56, which cooperates with drive wheel 52, includes a shaft 92 journaled for transverse movement through the plates 74 and 75. The shaft 92 has an enlarged end-section 93 that normally lies in a common plane with the V-groove of drive wheel 52.

It is prevented from moving inwardly of this plane by the smaller enlarged radii section 93a on shaft 92 adjacent shoulder 93 which abuts the outer wall of plate 74, that is, section 93a registers the edge of outer shoulder 93 in coplanar relationship with the plane of drive wheel 52. The shaft 92 is held in this normal position by the force of coil spring 94, which encircles shaft 92 and is compressed between the back plate 75 and an enlarged shoulder 95 on the outermost end of shaft 92.

In order to place the drive wheel on the wire cable 11, shaft 92 is moved to the right (with respect to the orientation of FIG. 4) by pushing in on the shoulder 95. This displaces the enlarged end-section 93 outwardly beyond the plane of the drive wheel 52 so that the wire cable 11 can move through the apertures 90 in cover plate 88 and end plate 89 into the V-groove 52a of the drive wheel 52. Upon release of the cable retaining means 56, coil spring 94 returns the end-shoulder section 93 to its coplanar position to retain the wire cable 11 in the V-groove.

The stabilizing wheel 53 is journaled for rotation on a fixed shaft 101 which is threaded into the support plate 74. An inverted, generally U-shaped protective cover plate 102 encloses the upper edge of wheel 53. It is held there by an enlarged shoulder 103 formed on the outer end of the shaft 101 (as particluarly illustrated in FIG. 6). The lower end of the protective cover 102 is stabilized by a bushing 106 which forms part of the cable retaining means 57, and the sides of cover 102 are held in spaced-apart relation by spacers 104 disposed on both sides of wheel 53.

An L-shaped end plate 105 is attached to the end of frame 51 adjacent auxiliary wheel 53. Its transverse side is apertured at 110 to receive the wire cable 11, in a manner similar to aperture 90 in plates 88 and 89. The hook aperture 110 acts to hold the cable 11 in the V-grooves of the wheels 52 and 53.

The cable retaining means 57 is similar to cable retaining means 56 and includes the hollow bushing 106 through the support plate 74, and a shaft 107 journaled in bushing 106 for transverse movement. Shaft 107 has an enlarged section 108 on its outer end and a coiled spring 109 mounted between the end of the bushing 106 and an enlarged shoulder 111 on the opposite end of the shaft 107.

Figure 6:
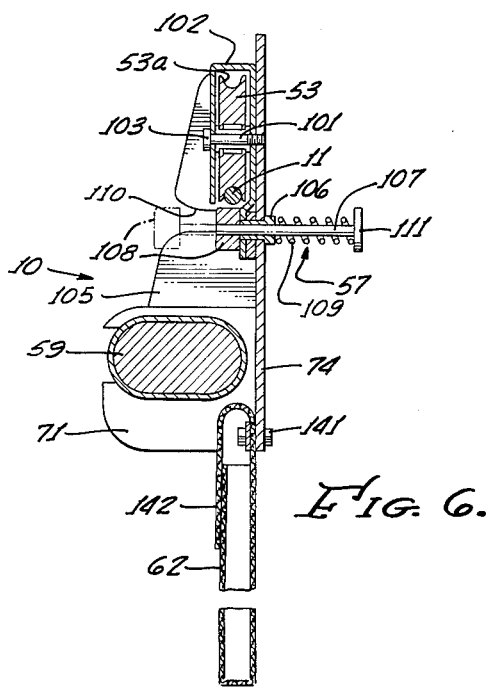
FIG. 6 is a section view taken along line 6—6 of FIG. 2 to illustrate the stabilizing support wheel and cable retainer means therefor.

When the retaining shoulder 108, which normally underlies auxiliary wheel 53, is moved outwardly to the position shown by the dotted outline in FIG. 6, it is possible to move the wire cable 11 through aperture into the V-groove 53a of auxiliary wheel 53. Once the cable retaining means 57 is released, the compressed spring 109 urges the retaining shoulder 108 into the plane of auxiliary wheel 53, which prevents the carrier 10 from being removed from wire cable 11.

In order to mount the overall film carrier 10 on the wire cable 11, it is only necessary to depress the enlarged shoulders 95 and 111 of the cable retaining means 56 and 57 and place the film carrier 10 over the wire cable 11 so that the cable 11 runs through apertures 90 and 110 and fits into the grooves 52a, 53a of the wheels 52 and 53. Thereafter, the cable retaining means 56 and 57 are released to lock the film carrier 10 on the wire cable 11 (positions as illustrated in FIGS. 4 and 6).

The retainer, retaining means or grab bar 66 in plan view approximates a pair of isosceles triangles affixed to the frame 51 at their apexes by screws and extending outwardly at their bases beyond the ends of the carrier 10.

Each end 66a of the retainer bar (see FIG. 3) defines an arc of radius $r$ about the longitudinal axis of wire cable 11 when the film carrier 10 is mounted on the wire cable 11. The radial distance $r$ constitutes essentially the same separation between the means 13 and the engaging means 12 as between the hook 23 and the wire cable 11.

The advantage of this curvilinear transverse shape of the ends 66a is brought out in FIG. 9 where different transverse rotational positions of an exemplary film carrier 10 are depicted. They show that the distance between the wire cable 11 and the location on the retainer bar end 66a does not change. If the film carrier 10 is moving with little or no sway, it will be oriented with respect to the cable and the horizontal as shown by the solid line drawing in FIG. 9. If the carrier 10 is swaying to the right, for example, it will be as illustrated by the dotted outline 116. On the other hand, if it is swaying the other way (towards the left of FIG. 9), it will be represented as shown by the dash-dot outline 117. Each of these relative positions are shown with their center lines 121, 122 and 123, respectively. In all cases it can be observed that the radial distance between the wire cable 11 and the overlying part of the retainer bar end 66a is substantially constant so that, as the film carrier 10 approaches a remote location such as illustrated in FIG. 1, the left end 66a of the retainer bar 66 will be in line with the gravity keeper 24 of the hook 23 irrespective of sway.

While the positioning of the motor and power pack substantially below the wire cable stabiilzes the firm carrier as it moves along the wire cable, any carrier sway remaining is not too important since the equal distant retainer bar 66 is provided.

In operation, as the film carrier 10 approaches a terminal position, such as that illustrated in FIG. 1, the end-plate 89 and drive wheel guard 88 are contacted by the bumper 43 attached to the de-acceleration means 12b just prior to the time the retainer bar end 66a moves interior of the mouth of hook 23. As soon as the retainer bar 66 is fully interior of the hook 23, the gravity keeper 24 drops down and firmly locks the motorized carrier at that end location.

The means 12b and the spring loaded engaging means 12a absorb the momentum of the carrier and stop it. The sudden de-acceleration of the film carrier 10 disables the control circuit 64 with the result that the film carrier 10 remains in a quiescent condition at the instant terminal location until it is removed from the wire 11 or sent back in the opposite direction.

The control circuit 64, depicted in FIGS. 7 and 8, includes means for reversing the rotation of the motor, a non-locking start switch, a lock-up path to maintain the motor in an operating condition and means responsive to a sudden de-acceleration of the motorized carrier to interrupt the operating circuit of the motor so that the film carrier remains in a quiescent condition at a terminal location until the motor rotation is again reversed and the start switch actuated.

FIG. 7 discloses the mechanical features of the control circuit 64 which are contained in box or enclosure 125 which is sealed by top 125a. These include a two-way polarity reversing switch 126, a non-locking start switch 127, a lock-up relay 128, a pair of non-locking stop switches 129 and 130 and an armature hammer 131 pivotally supported on pin 132 which is affixed to the frame 51.

The non-locking, normally closed stop switches 129 and 130 are mounted by L-shaped brackets 136 and 138, respectively, to the lower inner side of the square box 125 so that the switch plungers 129a and 130a are disposed on each side of the T-shaped armature 131.

The control circuit 64, shown schematically in FIG. 8, includes the battery 59 which is connected through limiting resistors to the wiper terminals of the two-way polarity switch 126. When the switch is at its left position, poles 1 and 2 connect the battery 59 to winding control relay 128 through the start switch 127. A lock-up path in parallel of start switch 127 is also provided by way of front contact 1 of control relay 128 and serially connected stop switches 129 and 130. Battery 59 is also connected by way of poles 1 and 2 through the front contacts 2 and 3 of control relay 128 to the winding of motor 58. Thus, with the switch 126 in the left position, closure of the start switch 127 places battery across the winding of control relay 128 which operates and is locked up over its front contact 1. The battery 59 is also connected to the motor 58 which starts the carrier moving along the wire cable 11.

The film carrier 10 will continue to move along the wire cable 11 at more or less constant speed until it reaches a terminal position such as that illustrated in FIG. 1. At that time, it will suddenly be de-accelerated as the retainer bar 66 is contacted by engaging means 12a and the auxiliary de-accelerating means 12b contacts the end of the carrier body 10. The de-acceleration causes the armature 131 to swing towards the terminal post position being approached. If the carrier is moving from right to left as shown in FIG. 1, the armature 131 opens—which interrupts the locking path for relay 128. This releases relay 128 which opens the battery path to the motor and the film carrier 10 will remain disabled at that terminal position until polarity switch 126 is switched to the right position (poles 3 and 4) and the start switch 127 is again closed.

When the polarity reversing switch 126 is switched to the right, it will place the wipers of switch 127 across poles 3 and 4 to reverse the polarity of the connections to the motor 58. Thereafter, closure of start switch 127 will again operate relay 128 and lock it up over its front contact 1 and through the series connected stop switches 129 and 130.

When the film carrier 10, moving from left to right, reaches the other remote location (not shown in FIG. 1 but similar), the sudden de-acceleration due to its contacting terminating means 12 will cause the armature 131 to pivot about axis pin 132 and counterclockwise and momentarily open the stop switch 130. The opening of this switch 130 breaks the lock-up path for relay 128 and causes the relay 128 to release. This stops the film carrier 10 until the start switch 127 is again depressed following a reversal of the polarity switch 126.

It can be seen from the foregoing that simple and effective means are provided to maintain the film carrier 10 in a fully operated condition as it moves along the wire cable 11 from one remote location to another, and to stop and hold the film carrier at a terminal position.

The film pouch 62 is attached to the lower part of frame 51 by a means of bolts or screws 141 and has a flap cover 142 to enclose it and retain the film firmly in the pack. The film carrying pouch 62 can be made of any water-tight or sufficiently flexible material, and can be provided with suitable fastener means for closing the flap 142 over the main part of the pouch itself so that a film pack can be carried in the pouch without fear of it falling out even if the film carrier sways severly during its movement along wire cable 11.

The self-contained motorized film carrier of this invention makes it possible to transport film along a wire cable stretched between locations at a substantial angle of elevation. It does not appear to make much difference whether the carrier is moving uphill or downhill. By way of example, in one test installation having a run of approximately 650 feet, on the downhill leg it took approximately 20 seconds to make the run while on the uphill leg it took approximately 23 seconds. The D.C. motor apparently acts as a governor and thus tends to keep the film carrier moving at a constant speed irrespective of the direction of movement. It is for this reason that the carrier is energized for a run even though gravity might be depended upon to move it otherwise.

Experiments have also been made to determine the impact required to disable the control circuit and the effect of substantial downhill or uphill lies on the operation of the disabling feature. Here again, the result has been negative, that is to say, a slight movement of the armature upon impact at either remote location is sufficient and the movement is obtained when the carrier hits the terminating means independent of whether the carrier moves uphill or downhill.

While the invention forming the present film carrier system has been described with respect to an exemplary embodiment, it should be obvious that certain variations and changes may be envisaged by those skilled in the art without departing from the spirit and scope of the invention. Therefore, it is understood that the invention should be limited only to the extent of the appended claims.

What is claimed is:

1. A system for transporting film between locations comprising, in combination,
    (a) a wire cable stretched between separate locations;
    (b) a carrier body having a storage space for film packs attached thereto;
    (c) means movably mounting said carrier body on said wire cable;
    (d) drive means operable to move said carrier body along said wire cable, said drive means including a motor and a lock-up control circuit therefor;
    (e) means operable to enable said drive means for movement of said carrier body along the cable in a preselected direction;
    (f) retainer means associated with said carrier body;
    (g) engaging means mounted adjacent the point of attachment of said wire cables at one of said separate locations to engage said retainer means and to hold said carrier body at said location whenever said carrier body is adjacent that location; and,
    (h) means responsive to the impact of said retainer means and said engaging means to interrupt said lock-up control circuit and disable said drive means when said carrier body reaches one of said locations.

2. A system for transporting film between locations comprising, in combination,
    (a) a wire cable stretched between separate locations;
    (b) a carrier body having a storage space for film packs attached thereto;
    (c) means movably mounting said carrier body on said wire cable;
    (d) drive means operable to move said carrier body along said wire cable;
    (e) means operable to enable said drive means for movement of said carrier body along the cable in a preselected direction;
    (f) retainer means associated with said carrier body, said retainer means including an arcuate portion which curves around the wire cable and is substantially equidistant therefrom when the carrier body is mounted on the wire cable;
    (g) engaging means mounted adjacent the point of attachment of said wire cables at one of said separate locations to engage any part of the arcuate portion of said retainer means and to hold said carrier body at said location whenever said carrier body is adjacent that location so that said engaging means will engage said retaining means even though said body is swaying in a transverse plane when it reaches said location; and,
    (h) means operative when said carrier body reaches one of said locations to disable said drive means.

3. A system for transporting film between separate locations in accordance with claim 2 wherein said retainer means projects outwardly from each end of said carrier body and the arcuate portion of the retainer means defines a substantially circular arc about the wire cable in a plane transverse to the cable.

4. A system for transporting film between separate locations in accordance with claim 2, and including means at each of said locations to absorb at least a part of the kinetic energy of said carrier body when it is stopped at one of said remote locations.

5. A system for transporting film between separate locations in accordance with claim 4 wherein each energy absorbing means includes compressible coil springs coaxially mounted on the wire cable and said engaging means, and said engaging means includes a keeper having a locking cam thereon to hold said retainer means upon engagement therewith.

6. A system for transporting film between two separate locations comprising, in combination,
   (a) a wire cable stretched between separate locations;
   (b) a carrier body having a storage space for film packs attached thereto and wire engaging means to slideably attach said carrier body to said wire cable;
   (c) drive means operable to move said carrier body along said wire cable in either direction;
   (d) arcuate shaped retainer means extending outwardly from each end of said body;
   (e) energy absorbing means mounted adjacent the point of attachment of said wire cable at each remote location;
   (f) said energy absorbing means designed to be contacted by an end of said carrier body as said body approaches one of said locations to absorb part of the kinetic energy of said body and reduce its speed;
   (g) spring-loaded engaging means mounted adjacent each point of attachment of said wire cable at said remote positions to engage the retainer means of said carrier body when said body reaches one of said remote positions;
   (h) manual means operable to enable said drive means to cause said carrier body to move along said wire cable in a preselected direction; and,
   (i) means responsive to the impact of said body against said energy absorbing means and said engaging means to disable said drive means.

7. A system for transporting film between locations comprising, in combination,
   (a) a wire cable stretched between separate locations;
   (b) a carrier body having a storage space for film packs attached thereto slideably mounted on said wire cable;
   (c) drive means;
   (d) control means operable to enable said drive means whereby said carrier body is moved along said cable in a preselected direction;
   (e) retainer means associated with said carrier body;
   (f) engaging means mounted adjacent the points of attachment of the wire cable at said separate locations to engage said retainer means whenever said carrier body reaches one of said locations; and,
   (g) means responsive to the de-acceleration of said carrier body when said retainer means contacts said engaging means to disable said control means.

8. A system for transporting film in accordance with claim 7 wherein said de-acceleration responsive means includes an inertia breaker; and said control means includes a source of power for said drive means, a start switch for connecting said source to said drive means, an independent lock-up path for said drive means and at least one normally closed switch in said lock-up path responsive to the displacement of said inertia striker to disable said drive means.

9. A system for transporting film in accordance with claim 8 wherein said control means includes a polarizing switch for polarizing the connection between said drive means and said source of power, said start switch is nonlocking and the inertia striker is a pivotally mounted hammer that cooperates with the armature of said normally closed switch to interrupt said lock-up path whenever an engaging means contacts a retainer means adjacent one of said locations.

10. A film carrier for transporting films along a guide wire stretched between two relatively remote locations comprising:
   (a) a body member having a pouch to carry film mounted thereon;
   (b) a drive wheel and an idler wheel mounted on said body in a common plane to define a path thereunder to receive a guide wire oriented for movement of the body member therealong;
   (c) drive means having self-contained power means operable to rotate said drive wheel;
   (d) wire retainer bearing means movably mounted adjacent said wheels to retain said cable thereon;
   (e) a control circuit mounted on said body member operable to control the operation of said film carrier; and,
   (f) said control circuit including means operable to enable said drive means so that said body member moves in a preselected direction and inertia means for disabling said drive means whenever the carrier reaches either of said relatively remote locations.

11. A film carrier in accordance with claim 10 wherein said retainer bearing means includes a pair of shafts slideably mounted in said body member below said idler wheel and said drive wheel, respectively, bearings attached to the ends of said shafts and spring means cooperating with said shafts and said bearings to urge said bearings to maintain alignment with said wheels but compressible to allow the film carrier to be disengaged from said wire cable; and,
   said control circuit includes a polarity selection switch, a start switch and at least one stop switch, the latter responsive to the de-acceleration of said film carrier when it reaches a remote location to disable said control circuit.

12. A film carrier for transporting films along a guide wire stretched between two relatively remote locations, comprising:
   (a) a body member,
   (b) a drive wheel mounted on said body,
   (c) an idler wheel mounted on said body member spaced from said drive wheel,
   (d) the peripheral surfaces of said drive wheel and said idler wheel defining grooves adapted to engage the guide wire in relatively tangential relationship for rotation of said wheels therealong,
   (e) drive means,
   (f) means connecting said drive wheel and said drive means for rotating said drive wheel,
   (g) self-contained power means supported adjacent said drive means and connected thereto for energizing said drive means,
   (h) a pouch mounted on said body under said idler wheel to carry film,
   (i) retainer bearing means mounted below said idler wheel and said drive wheel on said base in alignment with said drive and idler wheels, respectively, to retain said cable on said respective wheels, shafts supporting each of said idler bearings,
   (j) spring means engaged with said shafts to retain said shafts in a position with said bearing means in alignment with said wheels,
   (k) means to displace said bearing means against said spring means to allow disengagement of said wire from said wheels, and
   (l) switch means mounted on said body to cause said power means to be energized for movement in opposite directions when said switch means is transferred.

13. In a self-propelled film carrier adapted to move along a wire cable stretched between two remote locations, means for controlling the movement of the film carrier comprising, in combination,
   (a) self-powered motor means for a film carrier;
   (b) means to enable said motor means so that said film carrier is propelled along said wire cable in a preselected direction; and,
   (c) means responsive to the de-acceleration of said film carrier when it reaches a terminal point of travel to disable said enabling means.

14. Means for controlling the movement of a self-propelled film carrier in accordance with claim 13 wherein said enabling means includes a lock-up path for said self-powered motor means, and
   said de-acceleration responsive means includes at least one normally closed switch serially connected in said lock-up path and an inertia breaker operable on de-acceleration to momentarily open said normally closed switch thereby interrupting said lock-up path.

15. In a self-propelled film carrier adapted to move along a wire cable stretched between two remote locations, means for controlling the movement of the film carrier comprising, in combination,
(a) a source of D.C. power;
(b) a reversible motor;
(c) a control relay operable to connect said source to the winding of said motor;
(d) a reversing switch manually operable to reverse the polarity of said source as it is connected to said motor winding;
(e) a non-locking starting switch manually operable to energize said control relay by connecting said source to the winding thereof;
(f) a pair of non-locking stop switches mounted in spaced-apart relation on said film carrier;
(g) a locking circuit including a make contact of said control relay and said two non-locking stop switches serially connected to maintain said control relay operated after said start switch is released; and,
(h) a hammer pivotally supported on said film carrier intermediate said stop switches and responsive to the de-acceleration of said film carrier near a terminal point of its travel to actuate the one of said stop switches closest said terminal point to disable the operation of said film carrier by releasing said control relay.

16. A system for transporting film between two separate locations comprising, in combination,
(a) a wire cable stretched between dead-end posts at each location;
(b) a detachable carrier body having a storage space for film packs attached thereto;
(c) wire engaging means operable to slideably attach said carrier body to said wire cable;
(d) drive means for said carrier body;
(e) a retainer bar attached to said body and having curvilinear ends extending outwardly at each end of said body to overlie said wire cable;
(f) each of said ends of said retainer bar arcuately shaped in planes transverse to said wire cable to maintain the linear distance between an instant segment of the ends of the retainer bar overlying said wire cable and the wire cable itself substantially constant, even though said body and bar rotate transversely with respect to said wire cable;
(g) a retainer hook mounted on each of said posts in a plane parallel to said cable by a two-piece hollow tube guide, the effective length of said tube guide foreshortenable by telescoping one piece of said tube guide interior of the other;
(h) normally expanded spring means encircling each of said hollow tube guides intermediate each post-hook set to urge said hook away from its post;
(i) each of said hooks maintained by its tube guide at a spaced-apart distance from said wire cable approximately equal to the distance between said wire engaging means and the segment of said retainer bar thereabove so that said hook can engage and hold said retainer bar after contact;
(j) manual switch means to enable said drive means to cause said carrier body to move along said wire cable in a preselected direction; and,
(k) means responsive to the impact of said body against said hook to disable said drive means.

17. A system for transporting film in accordance with claim 16, and including means cooperating with each of said dead-end posts and the terminations of said wire cables to maintain said spaced-apart distances, yet relatively constant even though the angles between the lie of the cable and the dead-end posts may vary due to the relative heights of the two separate locations and the distance between them.

18. A system for transporting film in accordance with claim 17 wherein
said wire engaging means includes a drive wheel and idler wheel rotatably supported in a common plane to define a groove thereunder to engage said wire cable; and including,
spring loaded retainer bearings manually operable to permit the carrier body to be removed from said wire cable.

References Cited by the Examiner

UNITED STATES PATENTS

| | | | |
|---|---|---|---|
| 1,112,129 | 9/1914 | Galloway | 186—28 |
| 1,115,207 | 10/1914 | Kelsey | 105—50 |
| 1,130,721 | 3/1915 | Fisher | 104—115 |
| 1,195,319 | 8/1916 | Wulbers | 104—115 |
| 1,711,401 | 4/1929 | Baldwin et al. | 105—50 |
| 3,026,816 | 3/1962 | Russo et al. | 104—113 |

ARTHUR L. LA POINT, *Primary Examiner.*

MILTON BUCHLER, *Examiner.*

B. FAUST, *Assistant Examiner.*